March 28, 1967

J. YAMRON

3,310,876

INERTIAL PLATFORM OPERATIVE IN EITHER THE
STRAPPED-DOWN OR GIMBAL MODE AS SELECTED

Filed Oct. 30, 1961

INVENTOR
JOSEPH YAMRON
BY Donald J. Bradley
AGENT

March 28, 1967

J. YAMRON 3,310,876

INERTIAL PLATFORM OPERATIVE IN EITHER THE
STRAPPED-DOWN OR GIMBAL MODE AS SELECTED

Filed Oct. 30, 1961

INVENTOR
JOSEPH YAMRON
BY Donald F. Bradley
AGENT

United States Patent Office 3,310,876
Patented Mar. 28, 1967

3,310,876
INERTIAL PLATFORM OPERATIVE IN EITHER THE STRAPPED-DOWN OR GIMBAL MODE AS SELECTED
Joseph Yamron, West Hartford, Conn., assignor to United Aircraft Corporation, East Hartford, Conn., a corporation of Delaware
Filed Oct. 30, 1961, Ser. No. 148,761
4 Claims. (Cl. 33—61)

This invention relates to a guidance system for missiles and space vehicles, and particularly to a novel stellar-inertial guidance system which may be used to monitor or correct the alignment or azimuth heading of a ballistic missile during boost flight by the use of star sights during powered flight.

The system incorporates a stellar monitor, an analytically base motion isolated inertial measurement unit mounted on gimbals, and a flight computer, to eliminate the need for precise alignment prior to launch. The inertial measurement unit is one in which the gyros associated therewith are partially stablized against base motion and in which the reference coordinate system is calculated from the currents required to maintain the gyros at null. The inertial-measurement unit, as thus defined will hereinafter be referred to as a strapped-down inertial measurement unit, although it is evident that it is not a pure strapped-down unit, but one which has many characteristics of a pure strapped-down inertial-measurement unit. The relationships between the gimballed strapped-down system herein described, a pure strapped-down system, and a conventional stable-platform system will be discussed later.

A major feature of this system is the provision of alignment or azimuth correction during powered flight of coarse prelaunch alignment in order to attain optimum performance from a fully mobile weapon system. The system is applicable to weapons with ranges of from approximately 2000 to 85000 nautical miles, but is not restricted thereto and may be adapted for use with any type of missile or space vehicle.

The overall operation of the system is as follows. The inertial measurement unit is calibrated prior to flight by conventional methods, except that all orientations are readily available to the instrument cluster by virtue of its suspension in gimbals. The star angle sensor, which is an integral part of the instrument cluster, can be utilized to provide an optical reference in such applications as may require it. Immediately prior to launch a coarse alignment is achieved by gyro-compassing or by other means. The strapped-down IMU is then driven to an orientation selected to permit observation of the desired star by the star sensor during the boost phase. During boost the IMU is maintained in this orientation by the gimbal torquers, acting upon signals derived from the gyro outputs. The vehicle is rolled in such direction as to place the missile's star-viewing window in the line of sight to the selected star, and one or more star observations are made. From these observations, together with appropriate calculations by the flight computer, the azimuth alignment of the reference coordinate system is refined to the precision required of the overall trajectory to the target.

One of the characteristics of this system is that the physical orientation of the IMU cluster is not precisely controlled or maintained, and in fact is controlled only to the extent necessary to bring the selected star within the field of view of the star angle sensor. The refinement of the azimuth alignment from the stellar data refers to the orientation of the reference coordinate system stored analytically in the flight computer.

Subsequently the gross trajectory of the missile is corrected to the target azimuth with respect to the refined reference coordinate system. Thereafter the flight computer computes the velocity required to hit the target, and the propulsion unit is cut off when the correct velocity has been attained.

The system provides a flexibility of target selection together with a fast reaction capability. The flexibility together with selection will be provided specifically by the use of explicit guidance equations. With such guidance equations, the in-flight correction of azimuth alignment by the stellar monitor is possible, and therefore, a coarse before-launch azimuth alignment procedure suffices, thereby reducing the reaction time to fire. The ability to correct the azimuth during powered flight necessitates that a coarse alignment be available at launch, that the actual launch coordinates be accurately known, that new launch point data or target data be available for fast access and read-in to the guidance system, and that environmental effects of a ground-mobile phase upon the guidance system be negligible and such as can be quickly compensated. The coarse alignment may be obtained by operating the system in a gyro-compassing mode, or by other means. Gyrocompassing techniques are detailed in many standard references, for example, in Parvin, Richard H., Inertial Navigation, D. Van Nostrand Company, Princeton, N.J., 1962, page 194 et seq.

Within the past decade, great advances have been made in understanding the theory, operation and limitations of strapped-down inertial sensors for inertial guidance use. In a pure strapped-down system, the inertial sensors, both rotational and translational, are secured to the airframe base. Both angular and translational data are processed in a high-speed flight computer, to continually update both rotational and translational references. The inertial reference is stored analytically in the flight computer, whereas in the stabilized platform type of inertial measurement unit the angular reference is stored in inertial space by physical analogue. The effectiveness of a strapped-down inertial guidance system depends primarily on the availability of accurate high-speed sensors and computers. A novel strapped-down inertial measurement unit operating with a flight computer which processes the data in a program which used explicit equations for trajectory guidance has recently been proven sufficiently accurate for use in guidance systems. The strapped-down inertial measurement unit is described in detail and claimed in copending U.S. application Serial No. 164,649, now Patent No. 3,272,972, assigned to the same assignee as this invention.

A novel stellar-inertial sensor has been conceived using the strapped-down inertial sensors with a star-angle sensor mounted so that the star angle sensor and the inertial sensors are subjected to rotation and translation identical in frequency, phase and amplitude. A novel feature of the stellar-inertial sensor is the use of gimbals to support and orient the complete sensor cluster including the star sensor, or the strapped-down unit itself without the star sensor, resulting in a much simpler design and lower cost than a conventional platform system.

In comparing the conventional stable-platform type of IMU, the pure strapped-down IMU, and the subject system, the following salient characteristics are noted. In the stable-platform system, the reference coordinate system is maintained by physical analogue through an instrument cluster which is servo-driven to remain parallel to the reference coordinate system. In a pure strapped-down IMU the reference coordinate system is analytically maintained in the flight computer by continuously monitoring the currents required to null the gyros while the gyros are subjected to the rotations of the airframe. In the subject system the reference coordinate system is analytically maintained in the flight computer by continuously monitoring the currents required to null the gyros while the gyros are subjected to the rotations of the star angle sensor. Thus it is seen that while the subject system superficially resembles a platform system, in that gimbals are used, in function it resembles a strapped-down system; the primary difference being that in the subject system the instrument cluster measures the orientation of the star angle sensor rather than the airframe directly. Gimbal angle readouts are employed to determine airframe attitude, but these are only of such quality as may be necessary for airframe attitude control, and not of the high precision required for maintenance of the reference coordinate system. The distinction is of importance to the subject system because this characteristic enables the star angle sensor to be driven to any attitude required to view the selected star. The star selection is governed by the trajectory desired, and hence by the target assigned. The ability to slew to any star orientation, without knowledge of the star location prior to coarse alignment, enables the subject system to handle late target assignments, and thus enhances the system's fast reaction capability.

For the reasons discussed above, the subject system is referred to as a strapped-down type, although its hybrid characteristics are clear.

It is therefore an object of this invention to provide a novel stellar-inertial guidance system for use in missiles and space vehicles.

Another object of this invention is to provide a novel guidance system which will sense or correct the alignment or azimuth heading of a missile during flight.

A further object of this invention is a novel guidance system for missiles which utilize star sights taken during powered flight.

Another object of this invention is a novel guidance system which utilizes strapped-down inertial components in conjunction with a star sensor for providing data during flight.

A further object of this invention is a novel stellar-inertial guidance system utilizing a strapped-down inertial measurement unit mounted on gimbals.

Another object of this invention is a novel stellar-inertial guidance system for missiles including means for calibrating the star sensor prior to launch and in flight.

These and other objects and a fuller understanding of the invention may be had by referring to the following description read in conjunction with the drawings in which.

Figure 1:
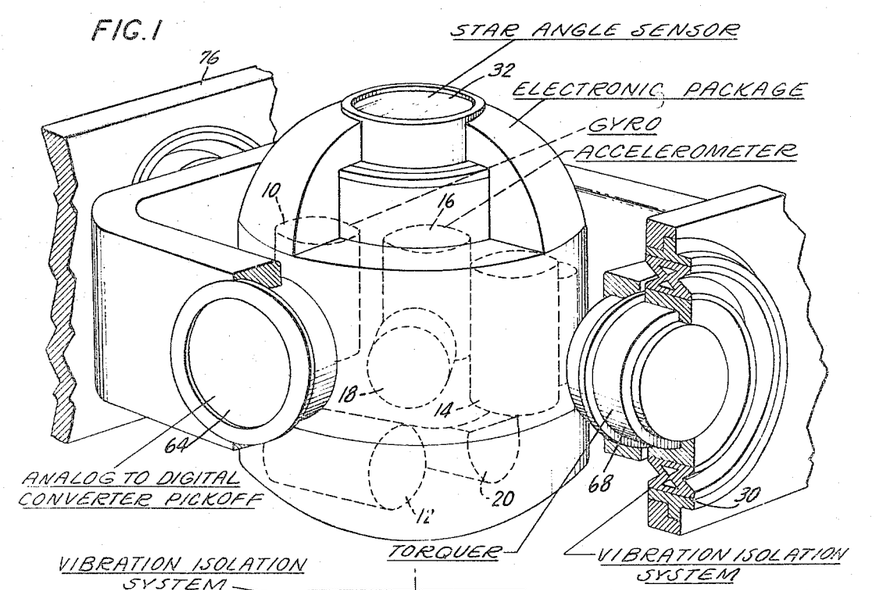
FIG. 1 is a perspective of the stellar-inertial sensor.

The stellar-inertial sensor is a complete integral package containing the strapped-down inertial measurement unit, the star-angle sensor, and a pair of gimbals, arranged as shown schematically in FIG. 1. A plan layout is presented in FIG. 2. The gyros 10, 12 and 14 and accelerometers 16, 18 and 20 of the strapped-down inertial measurement unit are located in a cylindrical cluster structure 22 supported by an inner gimbal 24 (Axis I) and an outer gimbal 26 (Axis II). The complete package is trunnion mounted to the missile airframe through a pair of vibration isolation assemblies 28 and 30.

Figure 2:
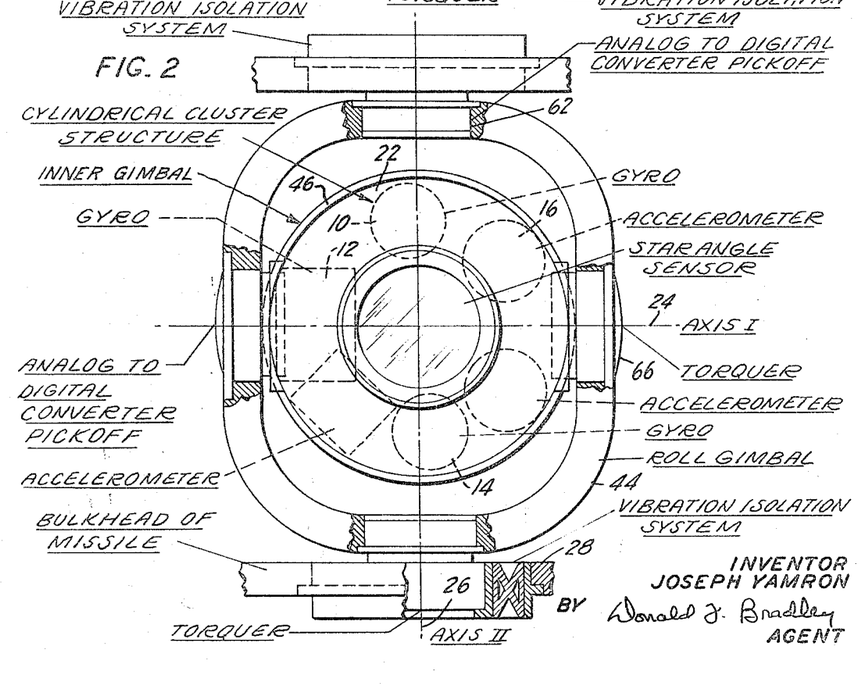
FIG. 2 is a plan view of the stellar-inertial sensor of FIG. 1.

The star-angle sensor 32 is secured rigidly within the cylindrical cluster containing the strapped-down inertial measurement unit, with its optical axis substantially collinear with the principal axis or axis of symmetry of the stellar-inertial sensor package. The proximity and locations of the strapped-down inertial measurement unit and the star angle sensor 32 provide a feasible approach to the idealized condition to reduce or compensate for spurious optical axis rotation or translation. The most important factor in the mechanical design of the star-angle sensor 32 is the nature of the light source. The star-angle sensor 32 will be used before missile burnout, so the star background includes the radiating atmosphere of the Earth. In addition to this optical noise associated with the terrestial tracking of daylight stars, there is extreme difficulty of tracking while subjected to the rigors of the mechanical environment associated with a missile in its booster stages.

The star-angle sensor 32 is fixed within a cluster containing the guidance system sensors. The ability to function under powered flight calls for a high rigidity within the gimbaled cluster supported by a vibration and shock isolation system. Since the star-angle sensor 32 (FIG. 3) is essentially a tube, the basic housing can be made sufficiently rigid to withstand the rigors of flight without excessive mass. Thus the relative component locations will be kept within functional tolerance. In essence the star-angle sensor proper consists of a rotating wedge 34, optical package including a reticle 36, and a detector 38, although it is obvious that other designs or types of star sensors may be used.

Figure 3:
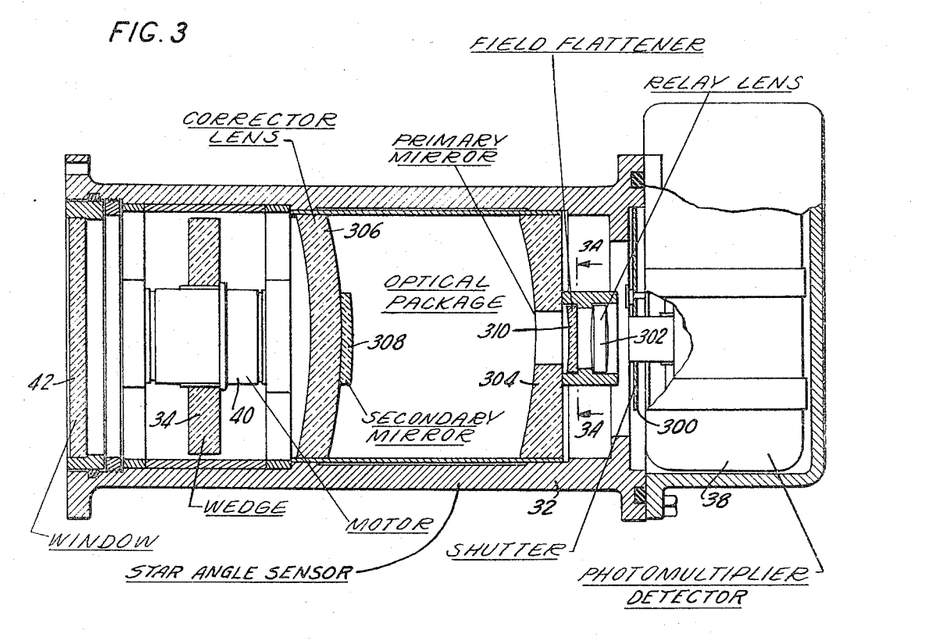
FIG. 3 shows the star-angle sensor used in the stellar-inertial sensor of FIG. 1.
Figure 3A:
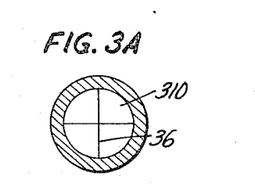
FIG. 3A indicates the reticle on the field flattener.

In order to assure extremely quiet, vibration free rotation, the wedge 34, the only moving part, is preferably mounted on the outer case of a synchronous-type motor 40. Since the rotor of the motor 40 is held stationary, the basic mount gives extremely stable operation.

The star-angle sensor 32 will preferably be pressure tight and filled with an inert gas. Viewing of a star is accomplished through a window 42 which also provides some shielding at temperature extremes.

The gimbal structure supporting the stellar-inertial sensor provides the following basic system features. First, partial isolation of the strapped-down inertial measurement unit gyros and accelerometers from extreme rotational rates of the airframe and vibratory displacements; second, the optical axis of the star-angle sensor 32 is directed for star acquisition by line-of-sight through an airframe window or aperture by means of torquers actuated by appropriate computer commands, so that star acquisition is accomplished with arbitrary orientation of the airframe, within the limits of window field of view; third, calibration and alignment of the strapped-down inertial-measurement unit prior to launch is significantly simplified by virtue of the gimbal structure and further by virtue of the star sensor 32. This calibration may be done in flight; fourth, accurate gimbal readouts and high response gimbal drives are not required; and fifth, precision rate information is available on the instrument cluster of the stellar-inertial sensor to stabilize the output of the star angle sensor electronics.

The gimbals 44 and 46 are provided to enable acquisition of a star as the missile ascends in powered flight. Consequently, the optical axis can be directed at pre-launch or in initial flight so that the star will appear in the star-angle sensor field-of-view as the missile pitches over on the ascent trajectory. The star sensor 32 does not have to track, it merely must look at the star long enough to get a usable signal for computation. The rate of rotation of the cluster containing the strapped-down inertial measurement unit and the star-angle sensor 32 will then be appreciably lower than would be encountered for the strapped-down inertial-measurement unit secured directly to the missile airframe. Therefore, the basic performance required of the gyros and accelerometers is relaxed as a result of the reduced dynamic range-of-angular-motion requirements. That is, the entire stellar-inertial sensor dynamic range-of-angular-motion is limited by the gimbals and the torquers to excursions substantially less than the missile angular motion, due to prior knowledge, at launch, of the star field. At all times during powered flight, regardless of the condition of the gimbal drives, the strapped-down inertial-measurement unit is providing inertial inputs to the flight computer. As an extreme example, the stellar-inertial sensor would still provide inertial guidance even if the gimbals "froze" or became inoperative.

The gimbal drives do not require high response or even high positioning accuracy. The star-angle sensor need only obtain the star within its field of view in order to provide the stellar azimuth correction.

Suitable location of a window in the missile airframe relative to the optical axis of a star sight device could normally be a serious problem. However, the gimbal assembly enables considerable freedom in design trade-offs for the optical window. The gimbal axes orientations relative to the missile principal axes are subject to design selection.

Finally, the calibration and alignment procedures for the strapped-down inertial-measurement unit gyros and accelerometers is simplified by virtue of the fact that the torquers drive the gimbals, by means of a suitable computer program, to a succession of orientations as required for calibration and alignment. In the past, effective calibration and alignment of strapped-down sensors has been complicated and tedious since it involved removing the package from the vehicle.

Immediately prior to launch the missile receives into its guidance computer the launch position as determined by the operating crew using maps and odometers or other suitable techniques. At the same time target coordinates are inserted, and a coarse azimuth heading is obtained by gyro compassing. A star inventory compatible with all possible target coordinates has been previously stored in the computer.

Following lift-off, the missile ascends initially in a near-vertical trajectory during which the missile is rolled to bring its yaw axis into coincidence with the coarse target azimuth. While the roll is being accomplished, no pitch or yaw commands are provided. The only pitch or yaw rates encountered will be due to either winds or missile misalignment with the vertical at lift-off.

Once the roll into azimuth is completed, missile pitch-over is started, to obtain a gravity turn until a particular flight path angle is obtained. This angle is selected on the basis of optimalization and/or lofting studies. During powered flight and at an altitude as high as practical, consistent with the fuel requirements for azimuth correction, a star sight is made and a precise azimuth heading measured. The coarse azimuth heading stored in the computer is then corrected and an appropriate yaw signal is generated to point the missile to the precise azimuth heading.

Throughout powered flight, the stellar-inertial sensor accelerometer outputs are sampled and stored. Two successive integrations of the resolved accelerations provide velocity and position data respectively. The stellar-inertial sensor pulsed integrating gyros are continuously operative at their high pulsing rate, so that angular velocity and displacement data is always available and continually up-dated at the flight computer for coordinate transformation operations on the accelerometer data. Knowing the vehicle velocity and position and the target position in geocentric coordinates, idealized velocity with the same direction as the actual velocity vector but of different magnitude is calculated, using explicit or Keplerian equations. This idealized velocity is that which would cause the missile to impact at the target. The flight computer continuously calculates the actual velocity, the idealized velocity, and the difference between the actual and idealized velocities; when the difference becomes zero the computer generates a signal to terminate booster thrust. Since the target point is fixed on the terrestrial surface, its location in geocentric or inertial coordinates is a known function of time, while the guidance system continually provides missile position in geocentric coordinates. Consequently, an iteration process of computation of both the idealized velocity and the idealized time-to-impact is provided to assure that missile impact will occur at the target point.

The guidance command will be directed to the engine controls at the same time that missile yaw, pitch and roll control is being maintained.

Figure 4:
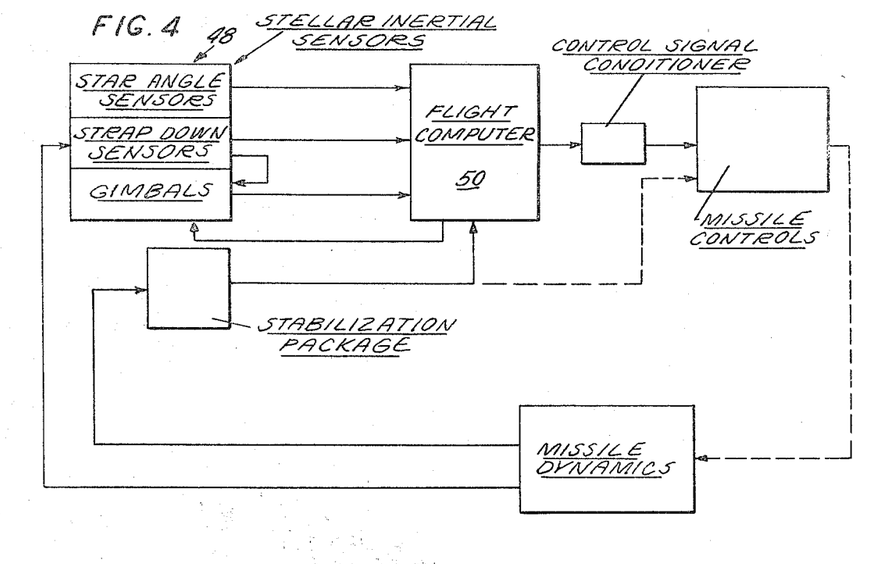
FIG. 4 is a functional block diagram of the stellar-inertial guidance system.

The functional block diagram of the proposed stellar-inertial guidance system is shown in FIG. 4. The basic sensor package is the stellar-inertial sensor 48 providing the inertial measurement data and the stellar monitor line of sight data to the flight computer 50.

The first purpose or objective of the stellar-inertial sensor 48 is to provide the computer 50 with vehicle velocity information to determine the missile's position and so determine when a suitable cut-off velocity has been reached. The second objective is to provide a means of sighting on a star in order to correct for take-off azimuth misalignment. The star sight is to be made during the powered flight phase and, therefore, in the presence of a vibration environment.

Figure 5:
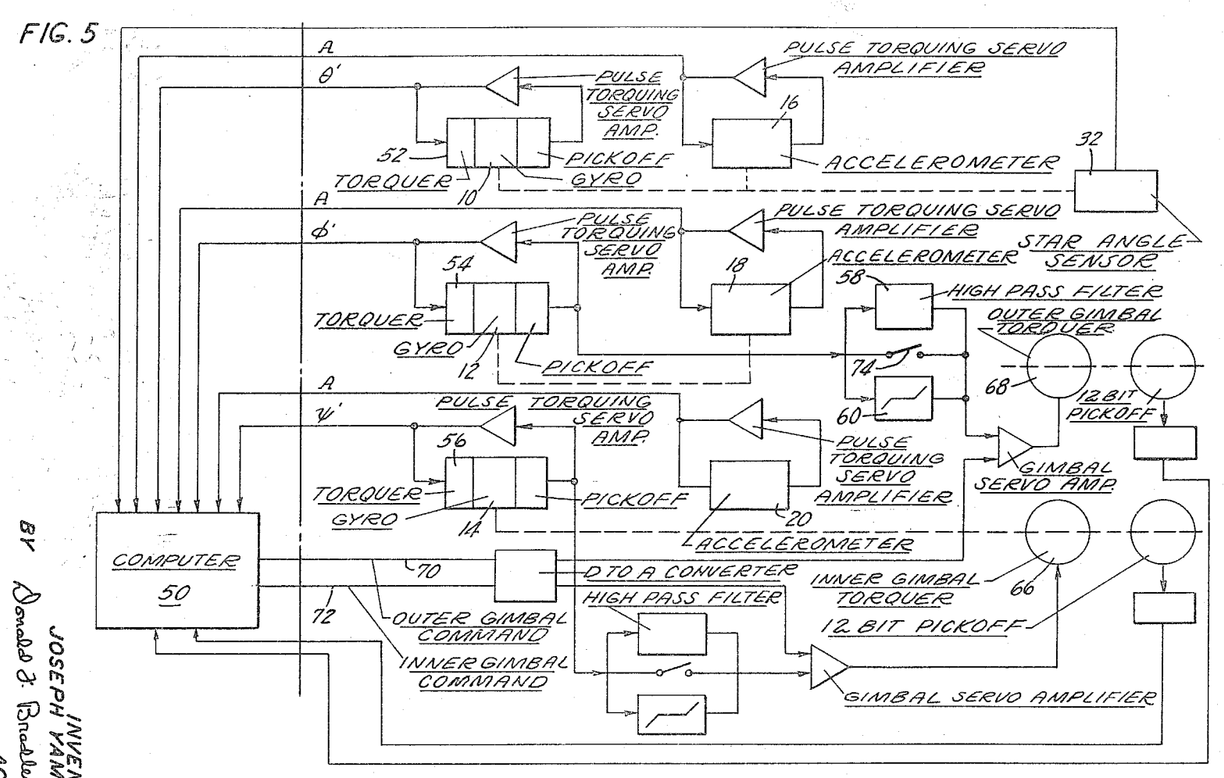
FIG. 5 is a functional block diagram showing the operation of the stellar-inertial sensor of FIGS. 1 and 2.

A functional block diagram of the stellar-inertial sensor operation is shown in FIG. 5. Three orthogonally aligned miniature floated integrating gyros 10, 12, 14 are mounted rigidly to a cluster, as shown in FIG. 1. The analog pick-off voltages are used to drive converters, which produce pulse trains to drive the respective gyro torquers 52, 54, 56 in typical strap-down loop fashion. Each pulse represents an increment of angular rotation of the cluster about the given gyro input axis. The pulse rate is therefore representative of the cluster angular rate. The pulse trains which drive each torquer also drive up-down counter-buffer register combinations, located in the pulse torquing servo amplifiers. The computer 50 interrogates each register in turn and is therefore capable of computing the gyro cluster position with respect to a reference system. Substantially collinear with each gyro is an accelerometer 16, 18 and 20 which also produces a pulse train where each pulse is proportional to an increment in velocity. A similar counter-register unit to that mentioned is used to provide this information to the computer 50 so that the velocity of the missile can be computed. Both magnitude and direction are known by combining the gyro and accelerometer information.

The gyro-accelerometer cluster is mounted inside a two gimbaled system as shown in FIGS. 1 and 2. Gimbal stabilization loops are provided (see FIG. 7) through a high pass filter 58 and a non-linear circuit (dead band) threshold detector 60. Full stabilization is provided continuously for high frequency disturbances and high angular rates of change in a given direction. This reduces the dynamic range requirements of the strap-down system components. The system operates in this manner during the navigation mode.

In order to accomplish the second objective of the stellar-inertial sensor, a star angle sensor is rigidly attached to the cluster and aligned with its line of sight substantially collinear with the gyro input axis which is perpendicular to the plane of the inner gimbal.

Figure 7:
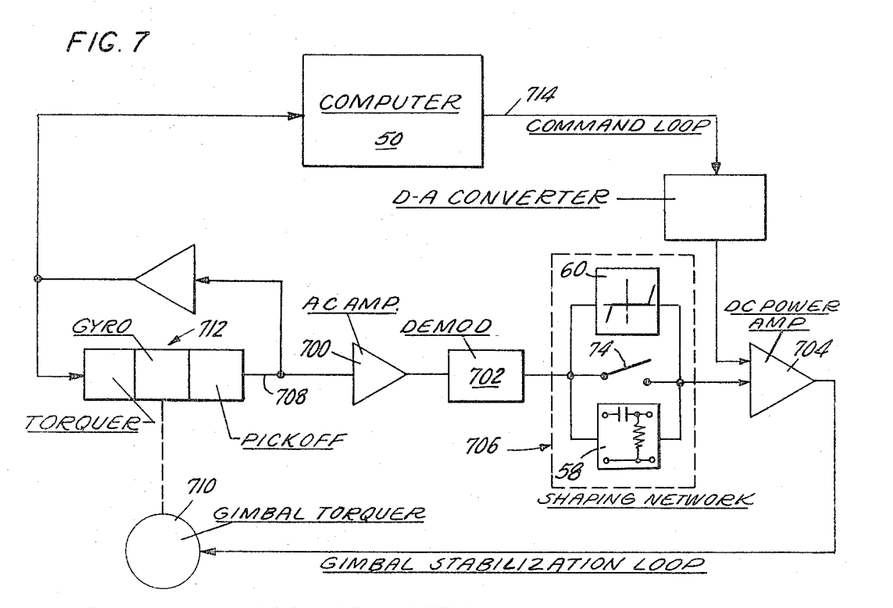
FIG. 7 is a functional block diagram of the gimbal stabilization system.

Before the star sight, the computer 50 extracts from its memory the declination and right ascension of the selected star, and calculates the orientation of the line of sight to the star with respect to the reference coordinate system. The gimbal angle readouts 62 and 64 provide the computer with the existing orientation of the optical axis of the star angle sensor with respect to the reference coordinate system. The computer calculates the difference between the orientation of the line of sight and that of the optical axis and provides a signal proportional to this difference to the gimbal torquers 66 and 68, which drive the gimbals 44 and 46 until the line of sight and the optical axis are approximately coincident. The torquing rate is set well below the threshold rate of the stabilization loop so that positioning can be accomplished in the presence of the partial stabilization loop. Since the positioning loop will have a limited frequency response, it is desirable to eliminate all high frequency components from the command signal without introducing system error. This has been accomplished by the presence of the high frequency filter 58 which by-passes the threshold detector 60. In this manner, full high frequency stabilization is provided and no high frequency components appear in the command signals 70 and 72.

When positioning of the star-angle sensor is complete, a switch 74 shunting the stabilization loop limiting circuits is closed. Full stabilization is supplied for the star sight. Motion about the line-of-sight is not attenuated by the two gimbal system. Such motion will have second order effects on the star sight outputs, which are eliminated by employing a nulling technique.

The outputs of the star-angle sensor 32 represent angular displacements referred to the analytical axis reference system. These signals drive counter-register combination which are interrogated by the computer.

In designing a particular system of inertial sensors so that a computer-stored inertial reference will be obtained, considerations include selection of the instrument configuration, the frame of reference, and the set of coordinate systems to represent the corresponding reference frames.

Three alternative *instrument configurations* are possible: 2 two-degree-of-freedom gyros and 3 accelerometers, 6 accelerometers (either in three pairs with a specified distance between members of a pair, or with 3 pairs of pendulous integrating gyro accelerometers (PIGA) with as short a distance as possible between members of a pair with wheels in opposite rotation), or 3 single-degree-of-freedom gyros and 3 accelerometers. Both the free gyro and the PIGA configurations require extremely accurate measurement of angles. The single-degree-of-freedom gyro configuration requires a stable torquer and a means of making current fed to the torquer measurable to high precision. By using pulse torquing, the gyro and the pulse torquer servo become in essence an analog-to-digital converter and the system outputs are directly useful for the digital computer.

The preferred system utilizes 3 single-degree-of-freedom gyros and 3 single axis accelerometers since electronic circuits required for accurate pulse torquing are more readily achievable than are accurate means for measuring angles in confined spaces.

The possible frames of reference are defined upon consideration of the 4 major functions of an inertial navigation system: base motion isolation, double integration of acceleration data to obtain position data, compensation of acceleration data for gravitational field acceleration components, and compensation of orientation data for the terrestrial rate of rotation. Base motion isolation for strapped-down sensors reduces to the problem of correct resolution of accelerometer outputs. The possible reference frames are an inertial frame, an Earth-fixed frame, and a present position frame. The required integration schemes for each of these possible reference frame sections are well known and will not be described in detail here. Inertial system platform designs are possible for each such reference frame. The preferred system is based upon an inertial reference frame.

Finally, the coordinate system must be selected for the inertial frame, earth-fixed frame, present position frame, or instrument frame. The preferred instrument coordinate system is based upon the conventional airframe body axes X, Y, Z, and is fixed with respect to the instruments. Other coordinate systems are possible.

Quantized current, controlled by servo action, enables the use of single-degree-of-freedom gyros in strapped-down systems. Linearity is obtained by employing a pulse torquing system that requires essentially a one-point calibration. The use of single-degree-of-freedom gyros allows full realization of the potential advantages of strapped-down systems, lower cost, smaller size, and flexibility. Another advantage is that the star-angle measuring device can be mounted directly on the inertial instrument cluster so that it is possible to use the instrument outputs directly to stabilize the star-angle sensor outputs.

The pulse torquing amplifier utilizes recent but proven developments in semi-conductor devices, zener diodes and switching transistors. Pulse torquing could be carried out in several ways. The preferred system for use herein is not a pure pulse torquing system in the sense of discrete pulses. The system is referred to as the "forced limit cycle" method and involves time modulation of fixed amplitude current pulses which alternate in positive and negative sign at fixed amplitude. The leading edge of one and the trailing edge of the other are synchronously fixed by the system. The crossover point is servo-controlled. This one modulated crossover point is permitted to occur at only certain discrete instants of time, and the output can therefore be easily converted into digital terms. The pulse information rate is much higher than the actual switching rate. The duty cycle approaches 100%.

Figure 6:
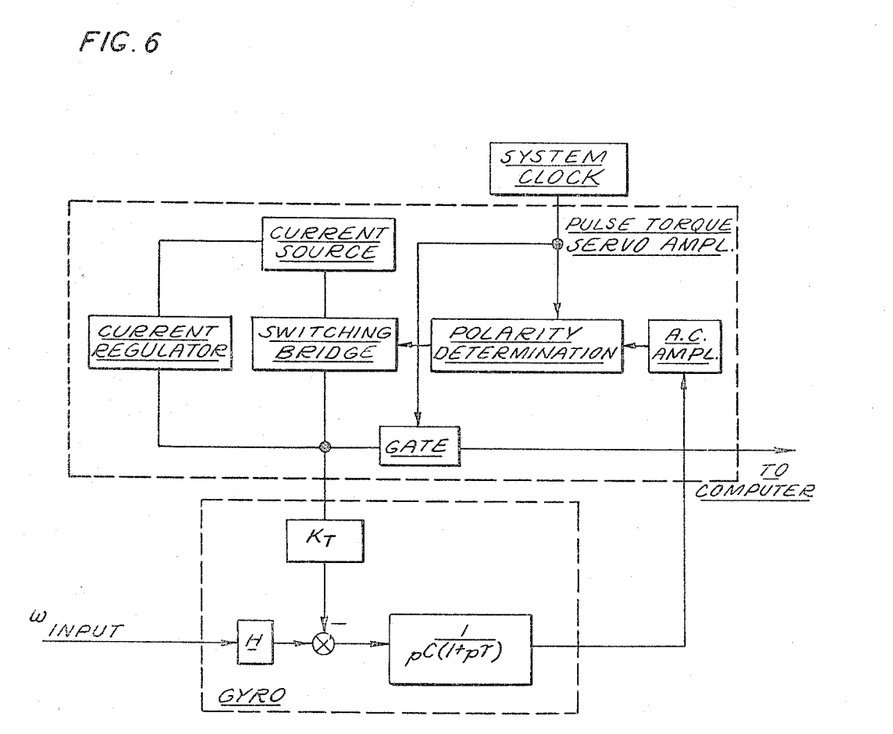
FIG. 6 is a functional block diagram of the pulse torque servo-gyro loop.

The "force limit cycle" method of pulse torquing is described in detail and claimed in copending U.S. application Serial No. 138,008, now Patent No. 3,192,371, filed September 14, 1961, entitled "Feedback Integrating System," and assigned to the same assignee. The advantages of the pulse torquing system include better resolution, higher maximum torque, simplified current regulation, synchronization of the output pulses with the digital computer, and less complex dynamic problems. The pulse torque servo-gyro loop is shown in FIG. 6.

The gimbal assembly 76 and its servo system have the following functions to perform: first, to rotate and position the star sensor 32 to view a star in response to a command from the computer; second, for high angular rates about the missile axes, to stabilize the gimbals to some extent in order to reduce the dynamic range required of the pulse torquing loop and thus improve its accuracy; third, to attenuate the relatively high frequency component of the missile angular vibration which might otherwise be transmitted to the cluster; and fourth, during a star sight, to provide adequate stabilization to the star-angle sensor to assure retention of the star within its field of view; and, fifth to permit calibration of the inertial-measurement unit without removal from the vehicle.

The gimbal servo system consists of gimbal stabilization loops and command loops, as shown in FIG. 7.

The stabilization loop electronics consists of an A.C. amplifier 700, demodulator 702, D.C. power amplifier 704, and shaping networks 706 to perform the required functions. The shaping networks consist of a nonlinear circuit 60 (dead band) for high missile rate stabilization, a high pass filter 58 for high frequency vibration stabilization, and a switch 74 for star-sight stabilization. The strapped-down inertial unit gyro pickoff signal 708 is proportional to the angular rate about the gyro input axis. When the pickoff signal 708 exceeds the dead band of the shaping network 706, the output of the shaping network 706 is fed to the gimbal torquer 710 which drives the gimbal in such a direction as to reduce the rate about the gyro input axis. The high pass filter 58 will pass the high frequency component of the gyro pickoff signal 708, which will torque the gimbals and stabilize the gyro 712 for high frequency angular vibrations.

Due to the dead band in the stabilization loop, it is possible to have the command signal drive the gimbal within the rate determined by the dead band. Since the command signal 714 is always being driven to a null, it is not necessary to maintain an accurate scale factor in digital-to-analog conversion.

The base motion isolation function as provided by the gimbals is most helpful during a star sight. Angular motion of the cluster is sensed by the gyros 10, 12, and 14, whose outputs are fed to the gimbal servo amplifiers, providing signals which cause the gimbal torquers 66 and 68 to torque the gimbals 44 and 46 in a direction opposite to the sensed angular motion. Attenuation is more than adequate at all frequencies for angular motions about the gimbal axes 24 and 26. For frequencies up to 12 cycles per second, the star motion will be less than 1 second of arc. However, when the inner gimbal 46 is tilted for motion about the line-of-sight, auto-stabilization no longer applies to the outer gimbal 44, and the attenuation deteriorates at high frequencies. Since the amplitude of angular missile vibration also decreases at high frequencies, this characteristic is not a problem. Further, since the bandwidth of the gyro pulse-torquing loops is quite high due to the forced cycle mode of operation, the star line-of-sight can be further stabilized against vibration by using the gyro rate information in the computer.

The positional difference between the star angle sensor optical axis and the line of sight to the star is calculated by the computer 50. The computer 50 resolves the error components into the coordinates of the gimbal axes. These error signals are fed to the appropriate torquers 66 and 68 which torque the gimbals 44 and 46 to drive the optical axis into approximate coincidence with the line of sight to the star.

Automatic calibration of a strapped-down inertial measurement unit, especially in the gimbaled assembly of the stellar-inertial sensor, is more convenient than automatic calibration of a platform system. The two gimbals of the stellar-inertial sensor can be used for coarse pointing in the calibration procedure.

Calibration of the accelerometers 16, 18 and 20 is essentially the same as for a platform type system and can be accomplished by multiple orientation selection with no external vertical reference and consequent complex data analysis, or moderately good positioning and consequent relatively simple computations.

On the other hand, calibration of the gyros is completely different than for a platform system. For a platform, gimbal clamping provisions must be available to enable gimbal test and measurement and very accurate measurement of angles must be provided for all possible orientations in calibrations.

The gyros in the analytical base motion isolated unit are calibrated by imposing discrete input angles and counting output pulses, rather than attempting direct physical measurement of an angle which may vary greatly and is a function of the inertial package orientation relative to Earth's rotation. On the other hand, the strapped-down inertial measurement unit calibration torquing amplifier is used in its normal mode of operation. Also, the successive reorientation for calibration is characteristic of its normal operation. The scale factor is obtained as pulses per unit of angular displacement. Accurate angular rate inputs are not required. Accurate angles can be obtained by using 360° rotation, thereby starting and stopping the pulses with the same (thus inherently repeatable) signal. Clamping is still necessary (by mechanical or servo means) to obtain good bias, but the time can be precalculated to give sufficient accuracy regardless of the sense and the magnitude of the bias. Three input conditions, 360° clockwise, clamped, and 360° counter-clockwise for each of the three orthogonal positions of the gyro input axes, yield more than sufficient data to enable computation of the mass unbalance, bias, and scale factor.

Also, the location of the star-angle sensor within the gyro cluster enables the use of optical means for calibrating the gyros. Hence, calibration would be possible without removal of the unit from a vehicle because of the direct optical access to the basic gyro reference.

The star-angle sensor 32 (see FIG. 3) is a reticle type sensor employing a photomultiplier detector 38. Its operation is based on a focal plane reticle 36 by which the star image is chopped so that the position of the image relative to the center of the reticle can be determined. The reticle type of star-angle sensor is preferred in this space application because it results in a small, simple device capable of withstanding severe mechanical shocks and vibration while, at the same time, it is capable of detecting dim stars. The star-angle sensor 32 consists of a compact optical electronic package housing the optical cell unit, wedge prism 34 and drive motor 40, reticle 36, shutter mechanism 300, photomultiplier 38, star-angle sensor preamplifier, photomultiplier high voltage supply, and provision for photomultiplier cooling. A second compact electronics package contains additional electronic circuitry for the triggering, filtering, and automatic gain control to make possible a substantial dynamic range in luminous intensity and to facilitate the direct use of the output signals by the digital computer. The design features a compact catadioptric optical cell which can be thoroughly tested as a separate unit.

A complete description of the star-angle sensor may be had by referring to copending U.S. application Serial No. 135,339, entitled "Star Angle Sensor," filed August 31, 1961, and assigned to the same assignee, the subject matter of which application is hereby incorporated into the present application.

It is also possible to use a detector similar to the one described and claimed in copending U.S. application Serial No. 122,253, now Patent No. 3,244,889, entitled "Matrix Startracker," filed July 6, 1961, and assigned to the same assignee. The spot location on the matrix, which is located in the focal plane, is identified by a pulse appearing on each of the grids.

Greater sensitivity of the detector may be obtained by use of a vidicon detector. The vidicon system would use a 256 x 256 element total picture. Means may also be provided for mechanizing the digital output from the TV system. The vidicon would be incorporated in the star-angle sensor housing. The wedge 34 and its drive motor 40 and the reticle 36 would be removed and the vidicon would be mounted in the space occupied by the photomultiplier.

Sufficient pointing accuracy and stabilization of the star-angle sensor line-of-sight are obtained by use of the strapped-down inertial system to require only a dynamic range of ±⅓ degree.

The optical system, shown in FIG. 3, consists of a rotating prismatic wedge 34, an imaging system, a reticle 36, a relay lens 302, and a photomultiplier tube 38. Imaging of the star on the reticle is obtained with a Maksutov-Cassegrain catadioptric system consisting essentially of a spherical primary mirror 304, a meniscus corrector lens 306, and a spherical secondary mirror 308. Light from a star is transmitted through and deviated by the wedge 34, which is driven at constant speed by a synchronous motor 40. The light is then transmitted through the corrector lens 306, reflected from the primary mirror 304, and reflected from the secondary mirror 308, which is cemented on the inner surface of the corrector lens 306. It then comes to focus on the reticle 36 after passing through a negative field flattening lens 310.

In order to avoid the effect of a variation in sensitivity over the photomultiplier photocathode surface, the radiation from the star is collimated by a relay lens 302 and then falls on a defined area of the photocathode. Light from any point on the reticle will be spread on this same area. In other words, the relay lens 302, together with the field flattener 310, image the aperture of the system on the photocathode 38.

Figure 8:
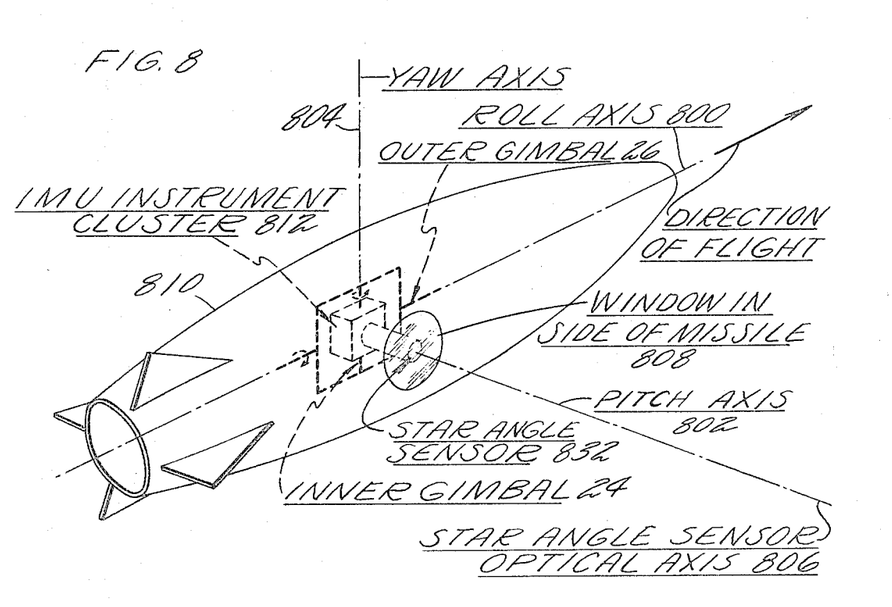
FIG. 8 indicates the mounting of the star angle sensor and the inertial measurement cluster in relation to the vehicle axes.

In FIG. 8 the mounting of the sensor and the cluster are shown in relation to the vehicle axes. The star angle sensor 832 has a line of sight 806 which is parallel to the pitch axis 802. The vehicle 810 axes are indicated by the roll axis 800, pitch axis 802 and the yaw axis 804. The direction of flight is parallel to the roll axis.

The star angle sensor 832 is shown mounted with the IMU cluster 812 and the combined assembly is movable about the roll axis 800 by use of the outer gimbal 26 and the yaw axis 804 by means of the inner gimbal 24. The window 808 in the side of the vehicle 810 is made sufficiently large to accommodate the necessary field of view. When the two gimbals 24 and 26 are originally aligned, the star angle sensor line of sight 806 is parallel to the pitch axis 802.

It can be seen from FIG. 8 that the gimbals 24 and 26 may absorb some of the high frequency vibrations about the roll and yaw axes but essentially the star sensor 832 must be directed through the window 808 for a star sight. The gimbals therefore, do not provide base motion isolation as is true with a pure space stabilized inertial sensor. There must then be base motion isolation computed and analytically preserved within the computer.

Stars selected for sighting will be close to the horizon in order to enhance the accuracy of the azimuth error angle determined by the star-angle sensor. The computer 50 will store catalog data (right ascension and declination) for a group of stars selected for their brightness with respect to the response of the sensor in the star-angle sensor, for freedom from neighbors with conflicting brightness within the measuring (dynamic) field of view of the star-angle sensor, and to provide adequate coverage so that a star will be available under any of the launch conditions.

Upon receipt of launch orders and target assignment, the computer will compute a trajectory to the target, including the missile attitude schedule along the trajectory. By reference to a catalog of stars whose declinations and right ascensions are stored in the computer memory, the computer will determine which stars are suitably located for viewing during the boost phase of the trajectory, and will select one star whose location is favorable for precise refinement of azimuth. In order to get the best compromise between number of stars, window size, and gimbal movement, a sighting star may be either to the right or left of the trajectory plane. Upon the selection of the star, the computer will determine in which direction the missile is to be rolled to properly locate the window for viewing by the star-angle sensor.

The star catalogue comprises two groups of stars. One group will be stars in a band above the celestial equator and the other group of those stars below the equator. The width of these bands will be selected in conjunction with the window size, so that the sequence of stars in order of right ascension is sufficiently dense that within the visibility cone of the window, there will always be a sighting star available.

The computer may keep track of the motion of the sun, moon, and certain planets for a given time period, so that otherwise desirable stars near the ecliptic may be used as much as possible. This selection function is only needed prior to launch when the computer is not at its maximum utilization.

As indicated previously, the guidance package (see FIG. 2) consists of an inner cluster pivoted about the yaw axis and a roll gimbal pivoted about the missile roll axis, giving the system two degrees of freedom.

The inner cluster contains three gyros, three accelerometers, a star-angle sensor, and various associated electronic components. The cluster is preferably encased in a thin, hermetically sealed cover, which contains an atmosphere of helium. The roll gimbal is exposed to the ambient missile environment.

The angular position of the cluster is controlled by D.C. torquers 66 and 68, and the angular position of the cluster relative to the roll and yaw axes will be sensed by non-contacting, shaft position, analog-to-digital encoders 62 and 64. These sensors are used to sense and control the position of the roll and yaw gimbals. The entire unit is trunnion mounted at the roll gimbal pivots to the missile structure through a pair of vibration isolators 30.

The flight computer, in its preferred form, is a microminiaturized general purpose parallel digital computer utilizing a complement of 36 instructions and a stored program to perform arithmetic operations on numbers consisting of 30 bits. The computer's basic clock rate is 833 kc., so that an elementary transfer or arithmetic function is performed on 1.2 microseconds. Ten such commands may be executed in each 12 microseconds, which is the minimum duration of an instruction as well as the time required for one memory read-write cycle. Times required for the basic arithmetic operations are 24 microseconds for addition, 168 microseconds for multiplication, 300 microseconds for division, and 288 microseconds for square root extraction.

Computer storage is divided functionally into two sections, the data memory and program memory, which are normally used in alternate cycles to obtain and execute instructions. The program memory has a storage capacity of 4096 16-bit instructions and is used to hold program instructions and constants required in the computations. Constants may be stored in the program memory to a double precision capacity of 32 bits, where needed. The data memory has a capacity of 1536 30-bit words and is used to store input data, intermediate arithmetic results, and computation results. Both memories operate on a cycle of 12 microseconds, and are read-out in parallel with random access capabiilty. The program memory operates in a non-destructive mode, since the program is stored permanently in a wired-in core configuration which cannot be destroyed by transient failures.

The memory unit includes separate data and program memories and their respective address decoders, inhibit drivers, sense amplifiers, and output registers. The computer unit includes the input-output, control, and arithmetic sections, as well as the program counter and data address register. The input-output (I–O) equipment includes an I–O decoder, which decodes input and output addresses; a vernier time register, which is used to measure input pulse intervals and to keep track of real time while the computer is operating in conditional sub-routines; and input control and output timing circuits, which control the transfer of input data to the memory register and the transmission of output data to the rest of the missile system. The control equipment includes an operation register, a time pulse generator, and command and status generators, which translate instructions into appropriately timed signals on the required command lines. The arithmetic section consists of a memory register, a B-box, an accumulator, and a quotient register, which together perform the actual arithmetic operations.

A detailed description of the flight computer will not be necessary since it is obvious that many other forms of computer may be used, all of which are well known in the art.

The stabilization package (see FIG. 4) is for the purpose of providing suitable damping of angular motions of the missile airframe. It consists of 3 rate gyros and associated electronics for output either to the flight computer, or to the missile controls directly.

It is obvious that since this system has the ability to make star sights and obtain data therefrom, the "launch in ignorance" operations described in copending U.S. application Serial No. 115,867 entitled "Guidance System" filed June 6, 1961, can be performed by this system. The teachings of the above-referred to application are hereby incorporated into this application.

I claim:

1. A navigation system for a space vehicle comprising an inertial measurement unit including a plurality of gyros mounted rigidly to a platform, said gyros being adapted to sense changes in vehicle orientation about preselected reference axes in a coordinate system, gyro torquing means responsive to said changes in vehicle orientation for nulling said gyros, said torquing means generating nulling currents proportional to the amplitude and rate of orientation change about said reference axes, a computer for continuously monitoring said nulling currents and maintaining an indication of vehicle orientation relative to said coordinate system, gimbal means for rotatably mounting said platform relative to said vehicle, means for generating signals indicative of the position of said platform relative to said vehicle, gimbal torquer means for rotating said platform about said gimbal means, means for feeding said gyro nulling currents to said gimbal torquer means to actuate said gimbal torquer means in response thereto, and circuit means including the parallel combination of a high pass filter circuit and a non-linear circuit connected between said gyro torquing means and said gimbal torquer means for passing said gyro nulling currents to said gimbal torquer means only when said gyro nulling currents exceed a predetermined value, said circuit means blocking passage of said gyro nulling currents to said gimbal torquer means to prevent rotation of said platform when said gyro nulling currents are below said predetermined value, said high pass filter circuit passing to said gimbal torquer means only the portion of said gyro nulling currents generated when the frequency of vehicle orientation change exceeds a predetermined value, and said non-linear circuit including a deadband and passing to said gimbal torquer means only the portion of said gyro nulling currents generated when the rate of change of vehicle orientation exceeds a predetermined value.

2. A navigation system as in claim 1 and including a stellar sensor fixedly mounted on said platform and having a known orientation relative to said vehicle, said stellar sensor being adapted to view a stellar body during flight of said vehicle, a switch connecting said gyro torquing means with said gimbal torquer means, and means for closing said switch to thereby feed all of said gyro nulling currents directly to said gimbal torquer means to rotate said platform in response to said nulling currents and thereby fully stabilize said stellar sensor when said stellar sensor is viewing a star.

3. A navigation system as in claim 2 in which said switch is connected in parallel with said high pass filter circuit and said non-linear circuit.

4. A navigation system as in claim 1 in which said gimbal means includes first and second gimbals, one of said gimbals being parallel to said vehicle roll axis, the other of said gimbals being parallel to said vehicle yaw axis.

References Cited by the Examiner

UNITED STATES PATENTS

| | | | |
|---|---|---|---|
| 2,914,763 | 11/1959 | Greenwood et al. | 343—9 |
| 2,931,910 | 4/1960 | Ostergren et al. | 250—203 |
| 2,949,030 | 8/1960 | Horsfall et al. | |
| 2,996,268 | 8/1961 | Brown et al. | 244—14 |
| 3,048,352 | 8/1962 | Hansen | 244—14 |

OTHER REFERENCES

Carroll, "Optical Resection and Inertial Systems," Aero/Space Engineering, vol. 18, No. 3, March 1959.

Cashmore, "The Role of Inertial Equipment," British Interplanetary Society J., vol. 18, No. 4, July-August 1961.

BENJAMIN A. BORCHELT, *Primary Examiner.*

CHESTER L. JUSTUS, SAMUEL FEINBERG,
*Examiners.*

A. E. HALL, L. L. HALLACHER, M. F. HUBLER,
*Assistant Examiners.*